(12) United States Patent  (10) Patent No.: US 9,172,225 B2
Turner  (45) Date of Patent: Oct. 27, 2015

(54) INDUCTION-BASED REFERENCE POINT LOCATOR

(71) Applicant: Labor Saving Systems, Ltd., Arlington, TX (US)

(72) Inventor: Mark Turner, Arlington, TX (US)

(73) Assignee: Labor Saving Systems, Ltd., Arlington, TX (US)

( * ) Notice: Subject to any disclaimer, the term of this patent is extended or adjusted under 35 U.S.C. 154(b) by 475 days.

(21) Appl. No.: 13/622,135

(22) Filed: Sep. 18, 2012

(65) Prior Publication Data

US 2013/0076344 A1  Mar. 28, 2013

Related U.S. Application Data

(60) Provisional application No. 61/537,787, filed on Sep. 22, 2011.

(51) Int. Cl.
*G01B 7/14* (2006.01)
*G01R 19/00* (2006.01)
*H02G 3/00* (2006.01)

(52) U.S. Cl.
CPC ........................................ *H02G 3/00* (2013.01)

(58) Field of Classification Search
CPC ....................................................... G01N 27/22
USPC ............................................... 324/67, 207.15
See application file for complete search history.

(56) References Cited

U.S. PATENT DOCUMENTS

| 5,194,812 | A | * | 3/1993 | Yokoi ........................... 324/326 |
| 5,296,807 | A | | 3/1994 | Kousek et al. |
| 5,434,500 | A | | 7/1995 | Hauck et al. |
| 5,558,091 | A | | 9/1996 | Acker et al. |
| 5,929,757 | A | | 7/1999 | Sternal et al. |
| 6,137,281 | A | | 10/2000 | Phillips et al. |
| 6,437,573 | B1 | | 8/2002 | Golder et al. |
| 6,441,599 | B1 | | 8/2002 | Kropidlowski |
| 6,541,965 | B1 | | 4/2003 | Binder et al. |
| 6,822,429 | B2 | | 11/2004 | Golder et al. |
| 7,228,252 | B2 | | 6/2007 | Alexander et al. |
| 7,367,131 | B1 | | 5/2008 | Hordis |
| 7,382,119 | B1 | | 6/2008 | Gasque, Jr. |
| 7,385,390 | B1 | | 6/2008 | Gasque, Jr. |
| 7,434,327 | B2 | | 10/2008 | Crorey |
| 7,498,796 | B2 | | 3/2009 | Georgeson et al. |
| 7,570,041 | B2 | | 8/2009 | Latraverse |
| 7,605,743 | B2 | | 10/2009 | Skultety-Betz et al. |

OTHER PUBLICATIONS

HILTI; PX 10 Operating Instructions; 2006 (16 pages).

* cited by examiner

*Primary Examiner* — Bot Ledynh
(74) *Attorney, Agent, or Firm* — James L. Baudino

(57) ABSTRACT

According to one aspect of the present disclosure, an induction-based reference point locator is provided. The locator includes transmitter locatable at a position on a first side of a structure, the transmitter configured to generate an alternating magnetic field at a desired frequency; and a receiver locatable on a second side of the structure opposite the first side, the receiver configured to detect the magnetic field and provide a directional indication to the position of the transmitter relative to the second side of the structure.

19 Claims, 5 Drawing Sheets

INDUCTION-BASED REFERENCE POINT LOCATOR

BACKGROUND

One of the methods used by an installer or other technician (e.g., an electrician) to locate a reference point on a first side of a structure (e.g., a wall, floor, ceiling, etc.) from a second side of the structure is to guess where the reference point might be on the first side of the structure and then drill a small test hole through the structure from the second side at the presumed location. With the test hole completed, the installer may move back to the first side of the structure and observe where the test hole came through the wall.

If the small hole came through the wall on the first side of the structure at or sufficiently proximate the reference point, the reference point was found and no further small holes may be required. However, if the small hole came through the wall on the first side of the structure undesirably or substantially far away from the reference point, the installer may move back to the second side of the structure, make another guess where the reference point might be on the first side (probably using the first small hole as a guide), and drill another test hole from the second side at the new location. Eventually, by repeating the above process a sufficient number of times, one of the subsequently drilled test holes will come through and open up on the first side of the structure at or sufficiently proximate the reference point on the first side. With the reference point now found, the installer is free to continue on with his work (e.g., fishing electrical wire to a new outlet being installed).

BRIEF SUMMARY

According to one aspect of the present disclosure, an induction-based reference point locator is disclosed. The locator includes a transmitter locatable at a position on a first side of a structure, the transmitter configured to generate an alternating magnetic field at a desired frequency. The locator also includes a receiver locatable on a second side of the structure opposite the first side, the receiver configured to detect the magnetic field and provide a directional indication to the position of the transmitter relative to the second side of the structure.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide an induction-based reference point locator. According to one embodiment, an induction-based reference point locator includes a transmitter locatable at a position on a first side of a structure, the transmitter configured to generate an alternating magnetic field at a desired frequency; and a receiver locatable on a second side of the structure opposite the first side, the receiver configured to detect the magnetic field and provide a directional indication to the position of the transmitter relative to the second side of the structure.

Figure 1:
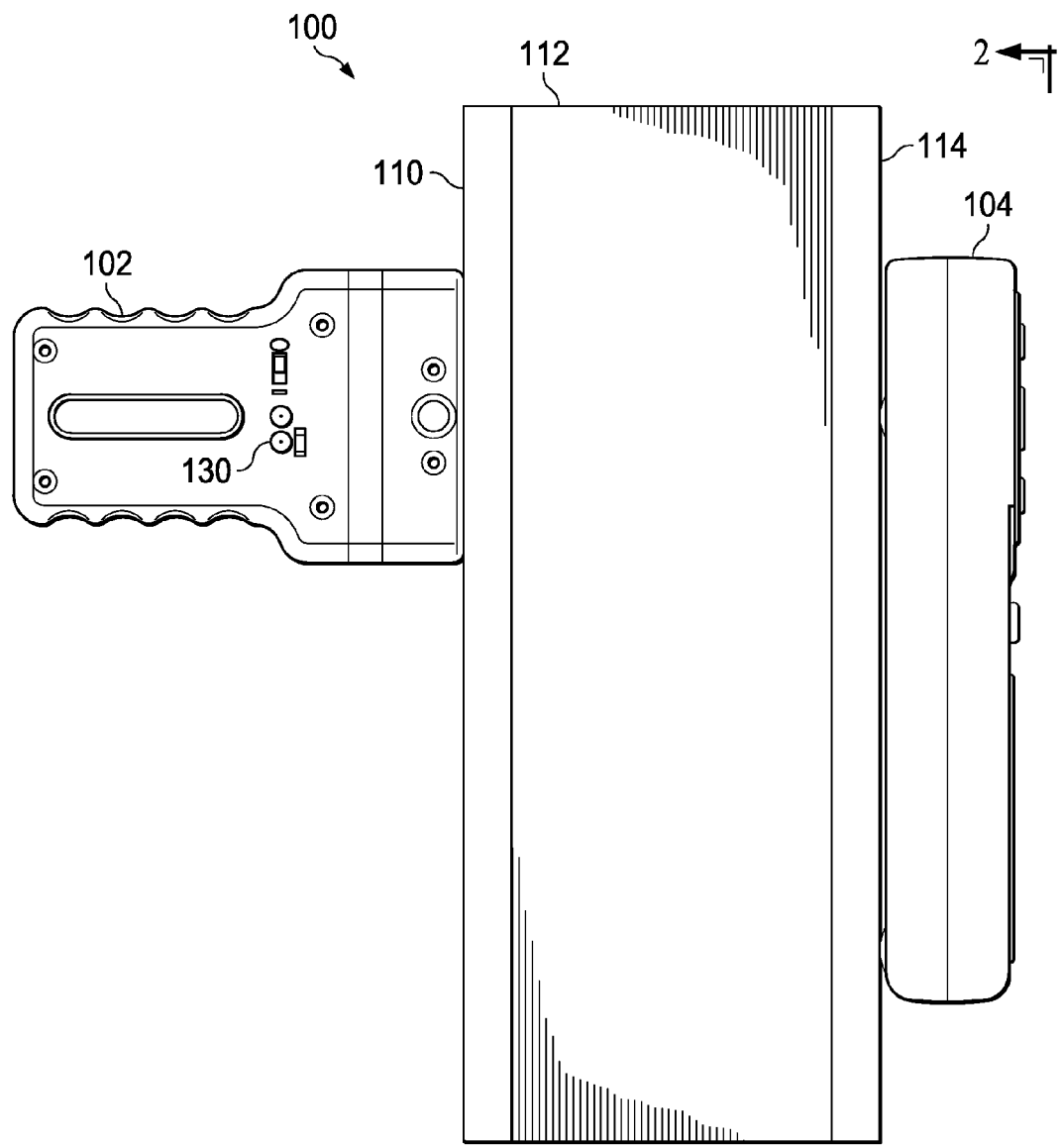
FIG. 1 is a diagram of an embodiment of an induction-based reference point locator according to the present disclosure relative to a structure.

With reference now to the Figures and in particular with reference to FIG. 1, a diagram of an embodiment of an induction-based reference point locator 100 is illustrated. In the illustrated embodiment, locator 100 includes a transmitter 102 and a receiver 104. As illustrated in FIG. 1, transmitter 102 comprises a mobile and/or portable device that is locatable at a desired position or location relative to a side 110 of a structure 112, and receiver 104 is a mobile and/or portable device that is locatable relative to an opposite side 114 of structure 112 relative to side 110. Structure 112 may be any type of structure such as, but not limited to, a wall, divider, floor, etc.

Figure 2:
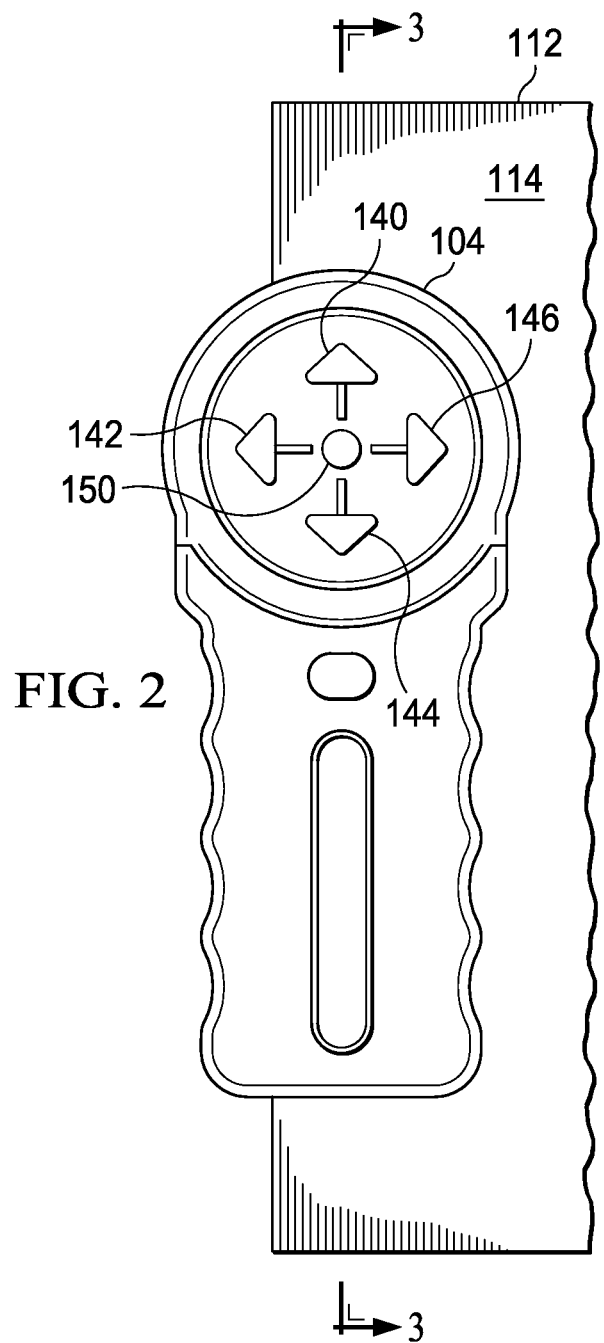
FIG. 2 is a diagram illustrating an embodiment of a receiver of the induction-based reference point locator according to the present disclosure.
Figure 3:
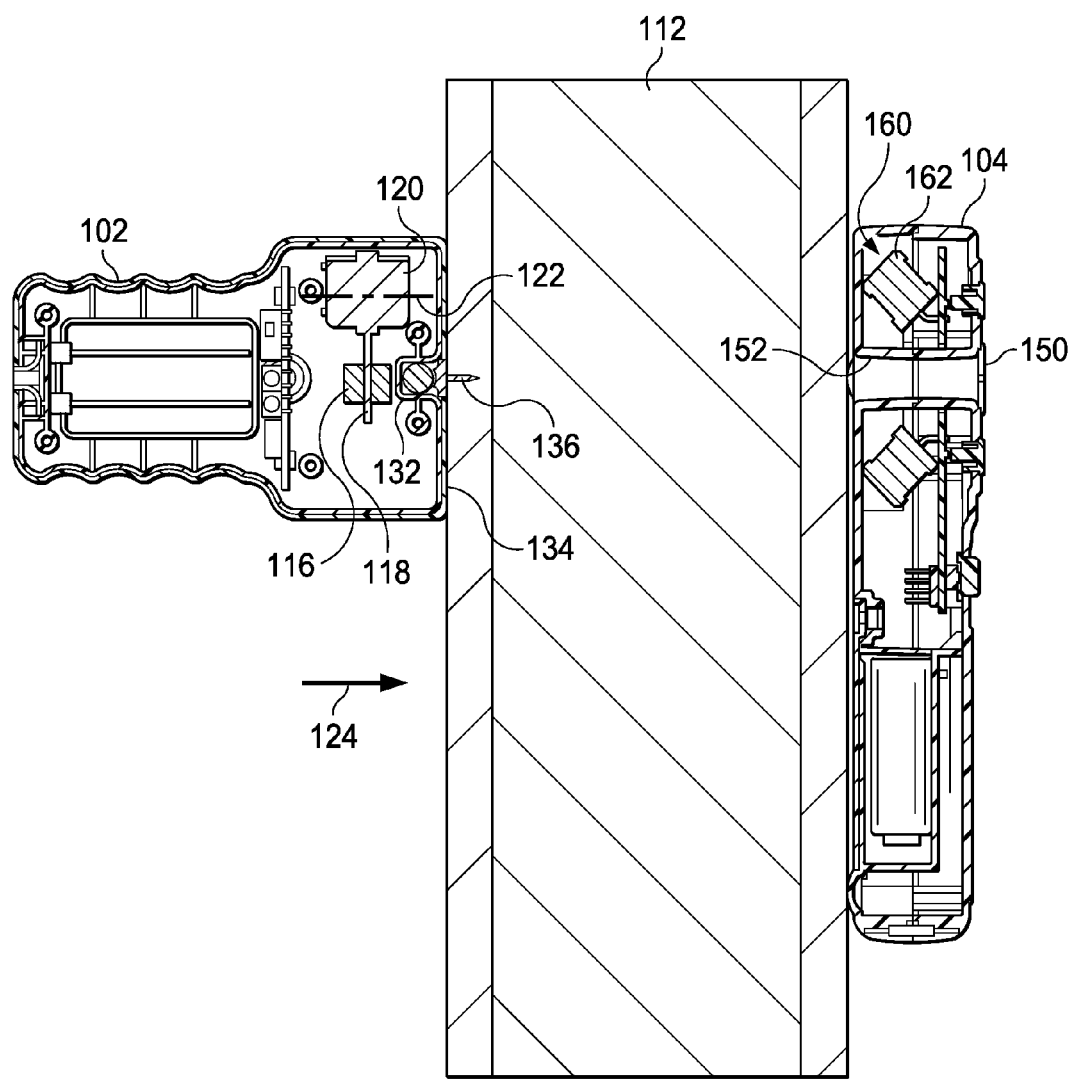
FIG. 3 is a diagram illustrating a section view of a transmitter and a receiver of the induction-based reference point locator of FIG. 1 taken along the line 3-3 of FIG. 2 according to the present disclosure.

FIG. 2 is a diagram illustrating a front view of receiver 104 of FIG. 1 in the direction of 2-2 of FIG. 1, and FIG. 3 is a diagram illustrating a section view of locator 100 and structure 112 of FIG. 1 taken along the line 3-3 of FIG. 2. As illustrated in the FIGS. 1-3, transmitter 102 comprises a housing for enclosing and/or containing therein components for generating an alternating magnetic field. In the illustrated embodiment, transmitter 102 includes a motor 116 coupled by a shaft 118 to a magnet 120. Motor 116 is configured to rotate magnet 120 at a desired speed or rotational velocity to produce an alternating magnetic field extending toward, into and/or through structure 112 toward receiver 104. Transmitter 102 is configured such that an axis of magnetic polarity 122 of magnet 120 is alternately rotated in or through a direction extending through structure 112 toward receiver 104 (e.g., in the direction indicated by arrow 124). For example, in the illustrated embodiment, motor 116 rotates shaft 118 to thereby cause rotation of magnet 120 about an axis defined by shaft 118. Motor 116 may comprise a direct current (DC) motor powered by an onboard battery supply; however, it should be understood that motor 116 may be otherwise powered. Referring to FIG. 1, transmitter 102 may comprise a speed control mechanism 130 for variably controlling a rotational speed of magnet 122 to thereby control the frequency of the alternating magnetic field generated by transmitter 102. In the illustrated embodiment, transmitter 102 generates an alternating magnetic field via a rotating magnet 120. It should be understood that different types and/or shapes of magnets may be used. It should further be understood that other methods of generating an alternating magnetic field may be used (e.g., via electrical coils) and corresponding methods may be used to alter and/or otherwise control the frequency of the alternating magnetic field generated by transmitter 102.

In some embodiments, transmitter 102 may be secured to side 110 of structure 112 using a variety of methods without user intervention and/or assistance in retaining transmitter 102 in a desired position (e.g., adhered to structure 112 with releasable tape, supported by a rod or other type of stand/ mounting device, etc.); however, it should be understood that transmitter 102 may also be retained in a desired location by a user or using other methods. For example, in the illustrated embodiment, transmitter 102 includes a recess 132 located on a side or face 134 facing side 110 of structure 112 to receive a pin 136 therein. Pin 136 may be partially insertable into structure 112 to facilitate independent retention of transmitter 102 at a desired location and/or position relative to side 110 of structure 112. It should be understood that a variety of methods and/or techniques may be used to retain transmitter 102, if desired, at a particular position and/or location relative to side 110 of structure 112. It should further be understood that the general orientation of transmitter 102 may be varied relative to structure 112 so long as the alternating magnetic field polarity extends through structure 112 toward receiver 104.

Receiver 104 is movable relative to side 114 of structure 112 and detects the alternating magnetic field generated by transmitter 102 to facilitate the location of a corresponding position or location of transmitter 102 on side 114 of structure 112. For example, in the illustrated embodiment, receiver 104 includes directional indicators 140, 142, 144 and 146. Directional indicators 140, 142, 144 and 146 may comprise light emitting diodes (LEDs) or other types of components for providing a visual indication for moving receiver 104 to align a locating region 150 of receiver 104 with a position of transmitter 102 on the opposite side of structure 112. It should be understood that other types of directional indicators may be used, instead of or in combination with, visual direction indicators (e.g., audio direction indicators). Locating region 150 of receiver 104 may comprise an opening 152 extending through receiver 104 toward side 114 of structure 112 to facilitate placing a mark or other notation on side 114 corresponding to a position or location of transmitter 102 on the opposite side 110 of structure 112.

In the illustrated embodiment, receiver 104 detects the alternating magnetic field produced by transmitter 102 via sensors 160. In the illustrated embodiment, four sensors 160 are used to provide two substantially orthogonal directional components (four directional components (up, down, left and right)) for aligning locating region 150 to a position of transmitter 102. However, it should be understood that additional sensors 160 may be used to provide additional direction indications. In the embodiment illustrated in FIGS. 1-3, each sensor 160 comprises a coil 162 such that each coil 162 may correspond to a different directional indicator 140, 142, 144 or 146. Receiver 104 may also be powered by an onboard DC power supply.

Figure 4:
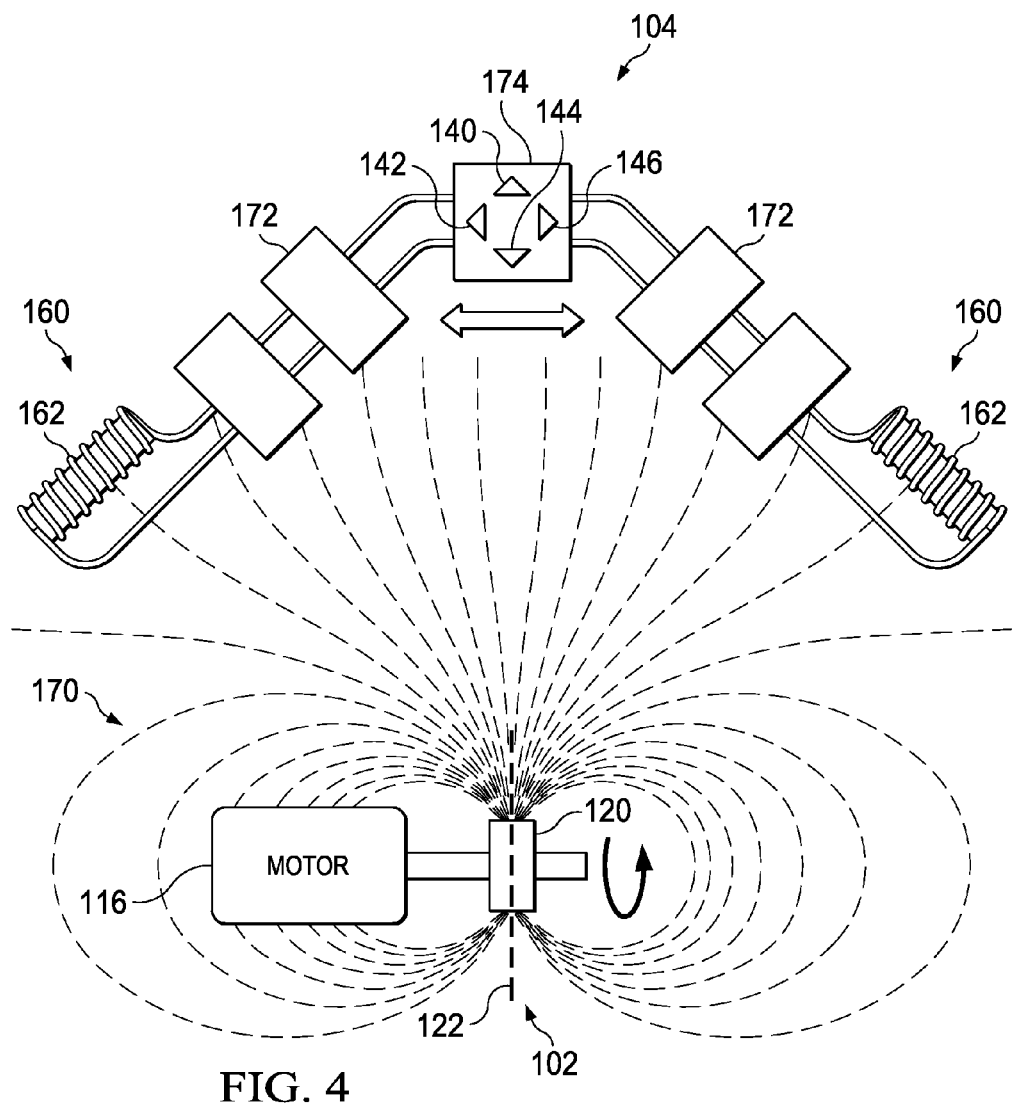
FIG. 4 is a diagram illustrating signal generation and detection of the induction-based reference point locator of FIG. 1 according to the present disclosure.

FIG. 4 is a diagram illustrating various functional components of transmitter 102 and receiver 104 of locator 100 of FIGS. 1-3. For ease of description and illustration, two sensors 160 in the form of coils 162 are illustrated to provide two directional indications; however, it should be understood that is in the embodiment illustrated in FIGS. 1-3, four sensors 160 are used each corresponding to a different directional indicator 140, 142, 144 and 146. In FIG. 4, an alternating magnetic field 170 is generated via motor 116 rotating magnet 120 at a desired speed to produce a desired frequency of the alternating magnetic field 170. Sensors 162 detect the alternating magnetic field 170 and convert the alternating magnetic field to an alternating current signal. The alternating current electric signal is fed into an amplifier 172 and thereafter fed into a digital processor 174. Digital processor 174 is configured to apply digital filtering techniques to determine, filter and/or otherwise identify the frequency of the incoming signal. It should be understood that various types of hardware and/or software components may be included in receiver 104 to perform filtering and/or amplification signal processing. Digital processor 174 is configured to filter the signal based on a particular frequency of interest (e.g., the frequency of the alternating magnetic field 170 generated by transmitter 102). Digital processor 174 is configured to compare the signal received from a particular pair of sensors 160 (e.g., a pair of coils 162 corresponding to directional indicators 140 and 144, or a pair of coils 162 corresponding to directional indicators 142 and 146) to determine their phase relationship. The phase relationship is used to narrow the receiver 104 field of view to eliminate or substantially remove unwanted signals. Sensors 160 in receiver 104 are positioned such that a change in position of the receiver 104 relative to transmitter 102 will produce a change in phase. When the phase meets a field of view threshold, the corresponding pair of signals are compared to determine which sensor 160 signal has the larger magnitude. Digital processor 174 then illuminates the corresponding directional indicator (e.g., indicator 140 or 144) to direct the user of locator 100 to move receiver 104 in a corresponding direction, thereby resulting in movement of receiver 104 towards the center or position of transmitter 102. In response to receiver 104 being moved into a position in which the signal from each pair of sensors 160 is approximately equal in magnitude, digital processor 174 may cause the corresponding pair of directional indicators (e.g., both indicators 140 and 144) to be illuminated, thereby indicating to the user that receiver 104 is centered relative to transmitter 102 in the corresponding direction. As indicated above, the frequency of the alternating magnetic field generated by transmitter 102 may be varied. Correspondingly, receiver 104 (e.g., digital processor 174 and/or other electronic components of receiver 104) may be programmed and/or otherwise adjusted to filter and/or otherwise identify the particular frequency of interest based on the frequency of the alternating magnetic field generated by transmitter 102.

Figure 5B:
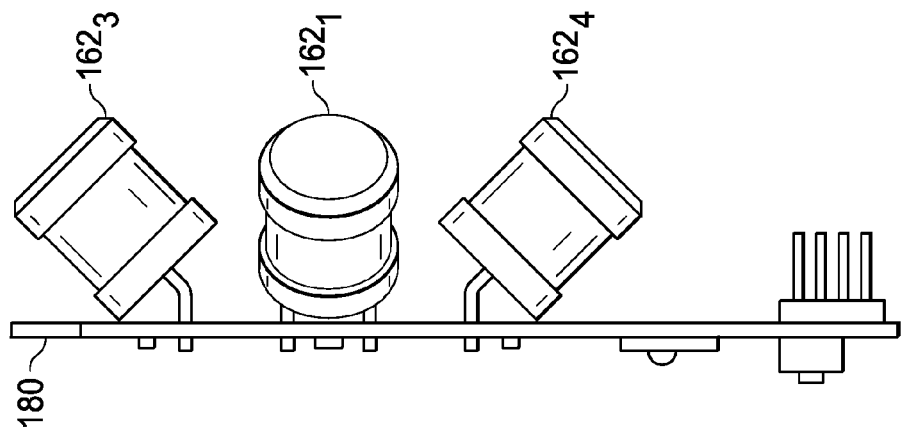
FIGS. 5A and 5B are diagrams illustrating a front view and a side view, respectively, of a receiver component of the induction-based reference point locator of FIG. 1 according to the present disclosure.
Figure 5A:
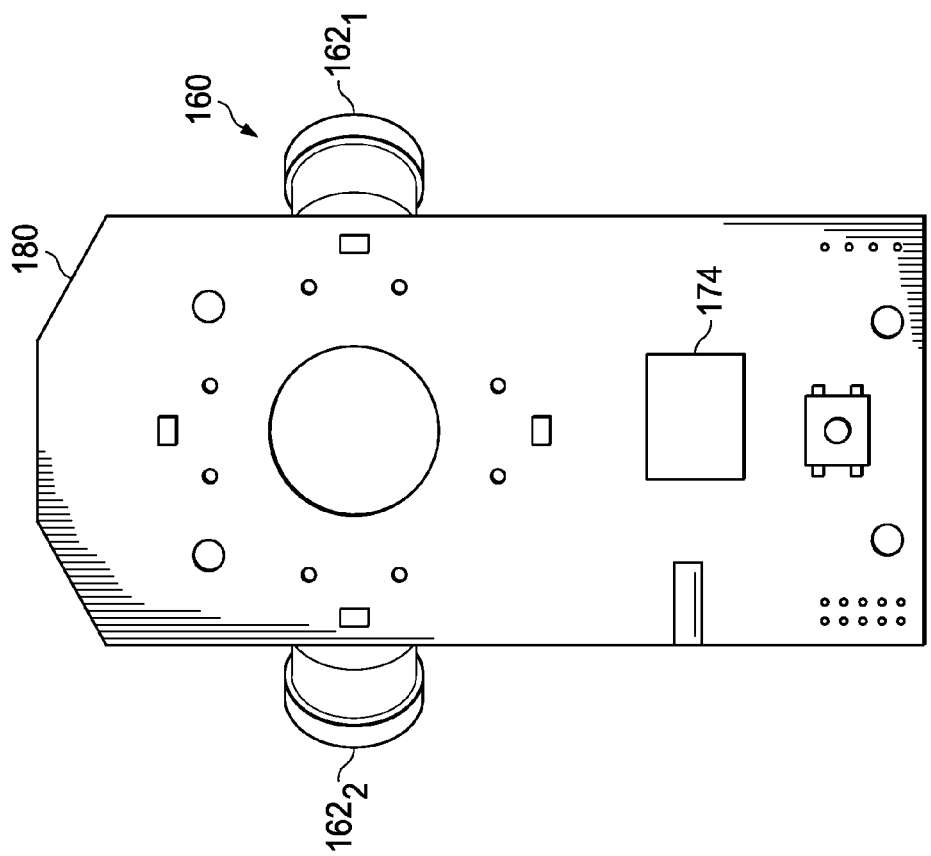

FIGS. 5A and 5B are diagrams illustrating a front view and a side view, respectively, of a circuit board assembly 180 of receiver 104 of the induction-based reference point locator 100 of FIG. 1 according to the present disclosure. In the illustrated embodiment, circuit board assembly 180 includes digital processor 174 and other associated circuitry. Circuit board assembly 180 also includes four sensors 160 each corresponding to a different directional indicator 140, 142, 144 and 146. For example, in the illustrated embodiment, sensors 160 comprise coils $162_1$, $162_2$, $162_3$, and $162_4$. Coils $162_3$ and $162_4$ correspond to directional indicators 140 and 144, and directional indicators $162_2$ and $162_1$ correspond to directional indicators 142 and 146. In some embodiments, sensors 160 are positioned on circuit board assembly 180 at a desired angular relationship to transmitter 102 and/or the magnetic field 170 produced by transmitter 102 to produce a substantially linear signal change in response to movement of receiver 104 relative to transmitter 102. For example, in the illustrated embodiment, each coil $162_1$, $162_2$, $162_3$, and $162_4$ is positioned at an approximately 45° angle (see also FIG. 3) relative to an incoming magnetic field generated by transmitter 102. However, it should be understood that other angular positions of coils 162 may be used in receiver 104.

As referenced above, receiver 104 may be tuned (e.g., via digital processor 174) to detect and/or otherwise provide directional indications corresponding to a frequency of interest based on the frequency of the magnetic field generated by transmitter 102. For example, in some embodiments, depending on the type of structure 112, the distance between transmitter 102 and receiver 104, other extraneous signal noise, or other factors, transmitter 102 may be configured to generate the alternating magnetic field at a desired frequency and receiver 104 configured to detect and/or respond to the corresponding frequency.

Thus, embodiments of the present disclosure provide a reference point locator that utilizes magnetic field generation to accurately locate a particular reference point from one side of the structure to an opposite side of the structure. Embodiments of the present disclosure also enable compensation for different types of structures and/or distances between transmitting and receiving components of the reference point locator.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An induction-based reference point locator, comprising:
   a transmitter locatable at a position on a first side of a structure, the transmitter configured to generate an alternating magnetic field at a desired frequency; and
   a receiver locatable on a second side of the structure opposite the first side, the receiver configured to detect the magnetic field and provide a directional indication to the position of the transmitter relative to the second side of the structure, and wherein the receiver comprises a plurality of coils for sensing the magnetic field, each coil associated with a different directional indicator.

2. The locator of claim 1, wherein the receiver comprises a sensor configured to convert the alternating magnetic field to an alternating current signal.

3. The locator of claim 2, wherein the receiver comprises a processor configured to filter the alternating current signal to identify the desired frequency.

4. The locator of claim 1, wherein the directional indicator comprises a visual indicator.

5. The locator of claim 1, wherein the transmitter comprises a motor for rotating a magnet at a desired speed.

6. The locator of claim 5, wherein the transmitter is configured to enable adjustment of the speed of rotation of the magnet.

7. An induction-based reference point locator, comprising:
   a transmitter locatable at a position on a first side of a structure, the transmitter configured to rotate a magnet to generate an alternating magnetic field at a particular frequency; and
   a receiver locatable on a second side of the structure opposite the first side, the receiver configured to:
      convert the alternating magnetic field to an alternating current signal;
      filter the alternating current signal to identify the frequency; and
      generate a directional indication to the position of the transmitter relative to the second side of the structure based on the alternating current signal.

8. The locator of claim 7, wherein the transmitter is configured to enable variable speed of the rotating magnet to vary the frequency.

9. The locator of claim 7, wherein the receiver comprises a plurality of coils for sensing the magnetic field, each coil associated with a different directional indicator.

10. The locator of claim 9, wherein each coil is disposed at an angle of approximately forty-five degrees relative to the transmitter when the transmitter and the receiver are positioned against the structure.

11. The locator of claim 7, wherein the receiver comprises a processor configured to filter the alternating current signal to identify the frequency.

12. The locator of claim 9, wherein the receiver comprises a processor configured to compare a signal received from each of a pair of coils and determine a phase relationship of the compared signals.

13. The locator of claim 9, wherein the coils are located an angle relative to the transmitter to produce a substantially linear signal change in response to movement of the receiver relative to the transmitter.

14. An induction-based reference point locator, comprising:
   a transmitter locatable at a position on a first side of a structure, the transmitter configured to cause a direction of magnetic polarity of a magnet to be alternately rotated in a direction through the structure an alternating magnetic field at a particular frequency; and
   a receiver locatable on a second side of the structure opposite the first side, the receiver configured to detect an alternating magnetic field generated by the transmitter and generate a directional indication to the position of the transmitter relative to the second side of the structure based on the alternating magnetic field.

15. The locator of claim 14, wherein the receiver comprises a plurality of coils for sensing the alternating magnetic field, each coil associated with a different directional indicator.

16. The locator of claim 15, wherein the coils are located an angle relative to the transmitter to produce a substantially linear signal change in response to movement of the receiver relative to the transmitter.

17. The locator of claim 14, wherein the receiver comprises a sensor configured to convert the alternating magnetic field to an alternating current signal.

18. The locator of claim 17, wherein the receiver comprises a processor configured to filter the alternating current signal to identify a desired frequency of the alternating magnetic field.

19. The locator of claim 14, wherein the receiver comprises a processor configured to compare a signal received from each of a pair of coils and determine a phase relationship of the compared signals.

* * * * *